United States Patent [19]

Koshida et al.

[11] Patent Number: 5,034,016
[45] Date of Patent: Jul. 23, 1991

[54] DYE COMPOSITIONS FOR DYEING DENIM COTTON YARN IN A RANGE OF COLORS AND DYEING PROCESS AND DYED ARTICLES USING SAME

[75] Inventors: Hitoshi Koshida; Tetsuo Sakagawa, both of Nishinomiya; Takayuki Nakayama, Amagasaki; Hiroshi Suwa, Kobe; Masao Imai, Yokohama; Akio Karasawa, Ohmuta, all of Japan

[73] Assignee: Mitsui Toatsu Chemicals, Incorporated, Tokyo, Japan

[21] Appl. No.: 356,189

[22] Filed: May 24, 1989

[30] Foreign Application Priority Data

May 25, 1988 [JP]  Japan ................... 63-127896

[51] Int. Cl.$^5$ .................. C09B 7/02; C09B 67/22; D06P 3/60
[52] U.S. Cl. .................................. 8/653; 8/638; 8/642; 8/649; 8/650; 8/696; 8/918
[58] Field of Search ................. 8/642, 649, 653

[56] References Cited

U.S. PATENT DOCUMENTS

| | | | |
|---|---|---|---|
| 2,034,305 | 3/1936 | Kunz et al. | 534/706 |
| 2,156,731 | 5/1939 | Lange et al. | 534/771 |
| 2,729,631 | 1/1956 | Nawiasky et al. | 534/798 |
| 3,023,212 | 2/1962 | Richter | 546/154 |
| 3,023,213 | 2/1962 | Richter | 8/657 |
| 3,023,214 | 2/1962 | Richter | 546/154 |
| 3,374,238 | 3/1968 | Wick et al. | 546/154 |
| 3,770,746 | 11/1973 | Blackwell | 8/532 |
| 3,865,804 | 2/1975 | Blackwell et al. | 8/532 |
| 4,199,317 | 4/1980 | Serex et al. | 8/471 |
| 4,443,226 | 4/1984 | Rohser | 8/532 |
| 4,820,685 | 4/1989 | Murata | 8/471 |
| 4,941,887 | 7/1990 | Sakagawa et al. | 8/642 |

FOREIGN PATENT DOCUMENTS

| | | |
|---|---|---|
| 276171 | 7/1988 | European Pat. Off. . |
| 59-51950 | of 1984 | Japan . |
| 1071187 | of 1967 | United Kingdom . |
| 1489456 | of 1977 | United Kingdom . |

OTHER PUBLICATIONS

E. R. Trotman's "Dyeing and Chemical Technology of Textile Fibres", Sixth Edition, (Wiley-Interscience), 1984, pp. 410 and 420.
John Griffiths', "Colour and Constitution of Organic Molecules", (Academic Press), 1976, pp. 199–200.
H. Zollinger in "Color Chemistry", (VCH), 1987, pp. 52 and 153.
Colour Index, Third Edition, (SDC. Dyers and Colourists), 1971, vol. 4, pp. 4602 and 4639.

*Primary Examiner*—A. Lionel Clingman
*Attorney, Agent, or Firm*—Fisher, Christen & Sabol

[57] ABSTRACT

Dyed denim cotton yarns capable of meeting the market demand for color jeans can be provided by immersing denim cotton yarns in a dye bath containing a dye or dye composition comprising a specific indirubin derivative(s), a specific quinophthalone derivative(s) and/or an indigo dye, squeezing and air-oxidizing the dyed yarns, and repeating a series of these steps.

14 Claims, No Drawings

DYE COMPOSITIONS FOR DYEING DENIM COTTON YARN IN A RANGE OF COLORS AND DYEING PROCESS AND DYED ARTICLES USING SAME

BACKGROUND OF THE INVENTION

1. Field of the Invention

The invention relates to the dyeing of denim cotton yarns. Specifically, the invention relates to dye compositions for dyeing cotton yarns such as denim cotton warps, to a dyeing process of cotton yarns using the dye compositions, and to dyed articles colored with the dye compositions.

2. Description of the Prior Art

Denim is popular for its touch and stoutness of cotton as textures for clothing and is used widely as work clothes, women's slacks, children's garments, etc.

Jeans made of denim have been in expanded use as clothing called blue jeans. The reason why blue jeans are used so widely is that the textures colored with indigo dyes are preferred for their unique tone of color and for the variation of the tone with the passage of time, and that the development of clothing giving importance to the feeling which makes the use of the variation is made possible. However, recent diversification and individualization of fashion have increased the demand not only for blue jeans but also for what is called color jeans, such as, those of yellow, red and black. Consequently, there has been a desire to dye denim, which is the texture for jeans, with various color tones ranging from grey to black. In dyeing cotton warps to prepare color denim, which is demanded by the vogue of color jeans, sulfur dyes, vat dyes, reactive dyes and naphthol dyes are being used. However, color jeans dyed with these dyes are different in properties from indigo-dyed articles, and hence the value of their commercial products ranging from dyed textures to clothing are different from those of conventional blue jeans.

As described above, blue jeans are preferred as clothing for their specific tone of color and other properties and these characteristics are also desired for color jeans. Sulfur dyes, vat dyes, reactive dyes and naphthol dyes do not impart such characteristics to their dyed articles. For instance, when the above-described dyes are used, the dyeing behavior of these dyes are too different from that of indigo dyes to process yarns in a rope-dyeing plant for blue jeans which employs indigo that has conventionally been in wide use. Therefore, these dyes are hardly applicable in such dyeing operation.

Moreover, with these dyes, decoloring effects cannot be expected by bleaching them with chlorine. As a result, in bleaching black denim composed of cotton warps colored with a black dye formed by blending indigo and ordinary yellow and red threne dyes, the blue color alone is decolored leaving an orange color remaining, thus resulting in a significant impairment of its commercial value. In other words, with rope-dyed products using a mixture of an indigo dye with other dyes including sulfur dye vat dye, naphthol dye, reactive dye, etc., fading effects as observed with blue denim cannot be expected because these dyes, unlike indigo, exhibit very small decoloring effects when bleached with chlorine. Hence, their commercial values are extremely inferior.

As described above, dyes which exhibit a similar dyeing behavior and similar properties to indigo have not yet been disclosed. Consequently, neither a dyeing process of cotton yarns using a novel dye having such properties nor color jeans using denim cotton yarns colored with such a dye have been disclosed.

BROAD DESCRIPTION OF THE INVENTION

An object of the invention is to provide dye compositions giving a similar dyeing behavior to indigo dyes and also exhibiting performances of decoloring effect similar to indigo when bleached with chlorine. Another object of the invention is to provide a rope-dyeing process of denim cotton warps in which specific dyes or the foregoing dye compositions are used. A further object of the invention is to provide dyed articles like color denim cotton warps dyed in a color tone ranging from yellow, red or grey to black by the above-described dyeing process.

The objects of the invention have been achieved by using the specific indirubin derivative and a specific quinophthalone derivative as a dyeing element.

In the invention, the indirubin derivative is a compound represented by the formula (I):

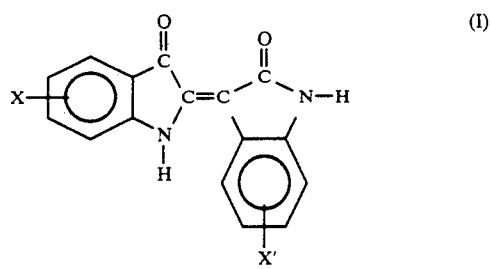

wherein X and X' represent individually a hydrogen, bromine or chlorine atom, there being 0 to 2 Xs and 0 to 2 X's, and the quinophthalone derivative is a compound represented by the formula (II) or (III):

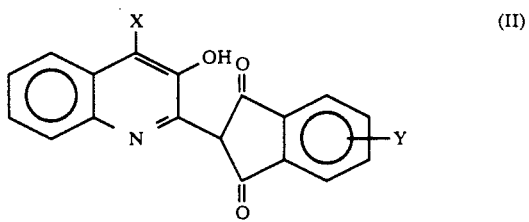

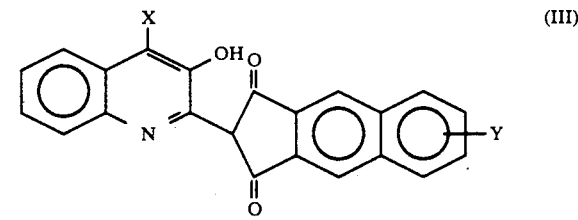

wherein X represents a hydrogen, bromine or chlorine atom and Y represents a —COOR or —COOC$_2$H$_4$OR group in which R is an alkyl group.

When used alone, the indirubin derivative can dye yarns with a single tone of red color, while with the quinophthalone derivative, a single tone off-yellow color can be obtained. Further, by blending these red and yellow dyes with indigo, it becomes possible to dye yarns in a color tone ranging from grey to black. Use of such dyes makes it possible to obtain dyed articles similar to those of indigo dyes in the coloring state of dyes and the time-dependent variation of dyed articles by a similar dyeing process to that of indigo dyes.

The dyeing of cotton yarns with the indirubin derivative alone, the quinophthalone derivative alone or a dye composition containing the indirubin derivative, the quinophthalone derivative and indigo can be effected by the process described below. For example, a large number of single yarns are formed into a piece of rope in the form of a tow, which is wound into a ball. The spherical-shaped warps are drawn simultaneously in large number and introduced into several set of dye baths equipped with squeezing rolls and airing devices, where they are subjected to repeated short-term dyeing and oxidizing operations so that they are gradually dyed more deeply in a continuous manner. In other words, the rope-shaped denim cotton warps are immersed in a dye bath containing the indirubin derivative, the quinophthalone derivative and an indigo dye, followed by their squeezing and air oxidation. These procedures are repeated so that color jeans ranging from grey to black can be obtained.

DESCRIPTION OF THE PREFERRED EMBODIMENT

The invention involves the following facts: The indirubin and quinophthalone derivatives generally have no ability to dye cotton by the process for dyeing cellulose fibers. Surprisingly, however, by repeating the above-described dyeing steps of denim cotton warps, the indirubin derivative represented by the formula (I) and the quinophthalone derivative represented by the formula (II) or (III) can dye cotton red and yellow, respectively, in gradual thickness. That is, the indirubin derivative and the quinophthalone derivative show the same dyeing behavior as indigo and, therefore, are able to dye denim cotton warps in the shape of a rope by the repeated application of immersion, squeezing and air-oxidizing steps. Moreover, the resultant dyed articles have excellent light fastness and exhibit similar decoloring effects to indigo-dyed articles when bleached with chlorine, and their time-dependent variation also shows a similar nature to indigo. Further, since the dyeing behavior of the derivatives resembles closely that of indigo, a combination thereof with indigo permits articles to be dyed in various color tones including black, thus meeting the demand for color jeans. The invention has been completed on the basis of these findings.

The yellow-type quinophthalone derivative of the invention is represented by the foregoing formula (II) or (III) and specifically includes the following compounds: namely, 2-phthaloylmethylidyne-3-hydroxyquinoline, 2-phthaloylmethylidyne-3-hydroxy-4-bromoquinoline, 2-(ethoxycarbonylphthaloylmethylidyne)-3-hydroxyquinoline, 2-(methoxycarbonylphthaloylmethylidyne)-3- hydroxycarbonylquinoline, 2-phthaloylmethylidyne-3-hydroxy-4-chloroquinoline and 2-naphthaloylmethylidyne-3-hydroxyquinoline, for example. These derivatives give a wide variety of yellow hues and hence can meet the demand for yellow jeans by their single use.

The red-type indirubin derivative is represented by the foregoing formula (I) and specifically includes compounds such as 2,3'-bisindole, the dibromo-substitute of 2,3'-bisindole and the tetrabromo-substitute of 2,3'-bisindole. These derivatives give a wide variety of red to purple hues and thus can comply with the demand for red jeans by their single use.

With regard to the dye composition of the invention, a blend of the red-type indirubin derivative and the yellow-type quinophthalone derivative yields an orange color, while a blend of the red-type indirubin derivative and an indigo dye gives a purple color. Grey to black colors can be produced by blending the red-type indirubin derivative, the yellow-type quinophthalone derivative and an indigo dye.

The red-type indirubin derivative and the yellow-type quinophthalone derivative are generally mixed singly. However, one or more red-type indirubin derivatives can be mixed with one or more yellow-type quinophthalone derivatives to obtain the desired color tones.

A composition comprising at least one kind of each of the red-type indirubin derivative and the yellow-type quinophthalone derivative and an indigo dye can produce various colors ranging from grey to black by blending these components in a variety of proportions. For instance, a dye composition comprising 2-phthaloylmethylidyne-3-hydroxy-4-bromoquinoline, 2,3-bisindole and indigo in an approximate proportion of 3 : 1 : 6 is employed to obtain black jeans.

No particular restrictions are imposed on the blending proportion of the dye composition comprising indigo and the red-type indirubin and yellow-type quinophthalone derivatives. The dye composition is prepared in accordance with desired hues by blending indigo, the red-type indirubin derivative and the yellow-type quinophthalone derivative in the desired proportions followed by the addition of various additives, for example, 1 to 20 parts of the neutral inorganic salt, such as, anhydrous sodium sulfate and 20 parts or less of an anionic surface active agent, such as, lignin-containing dispersants.

The dye composition obtained as described above is available usually in the form of a powder. However, the composition can be obtained in various desirable forms including powder, granule, paste, etc., depending on the purpose of use.

The dyeing process of the invention using the above-described derivatives or compositions comprises forming denim cotton warps into a rope, immersing the rope in a dye bath containing the indirubin derivative of the formula (I) and indigo; said indirubin derivative and the aforementioned yellow-type quinophthalone derivative; said indirubin derivative, yellow-type quinophthalone derivatives and indigo; and the dye bath contains each dye separately, squeezing and air-oxidizing the resultant rope, and repeating a series of these steps, so as to conduct the rope-dyeing of denim cotton warps.

The dye bath containing the aforementioned dyes is added with an alkaline material, such as, caustic soda or caustic soda plus soda ash for its preparation. The concentration of the dyes in the dye bath is determined depending on its desired thickness in dyed articles. In general, an undiluted dye solution with a concentration of 10 to 50 g/l is prepared separately and, using this solution, dye baths with concentrations of 0.5 to 10 g/l are prepared. The amount of the alkali used can preferably be in slight excess of the amount with which the indirubin and/or quinophthalone derivatives are allowed to dissolve. However, the quinophthalone derivative is not necessarily required to dissolve in the dye bath completely.

In the process of the invention, use of the indirubin derivative alone causes articles to be dyed red, while use of the quinophthalone derivative alone gives yellow-colored products. In addition, a combination of these derivatives with indigo permits dyed articles to have desired hues in the range of grey to black by way of example.

To this end, there is the method in which articles are dyed in a dye bath containing the indirubin derivative, the quinophthalone derivative and an indigo dye, and a method in which articles are dyed in separate reduction baths, each containing the indirubin derivative or else the quinophthalone derivative and indigo dye.

For a dye bath containing the indirubin derivative, the quinophthalone derivative and an indigo dye in coexistence, it is allowable to use the indirubin derivative, the quinophthalone derivative and an indigo dye, all of which have been provided independently or alternatively the dye composition of the invention.

When the independently-provided red-type indirubin derivative, yellow-type quinophthalone derivative and indigo dye are used, the indigo dye is used first in a requisiter amount in accordance with a desired hue and then an alkali, such as, caustic soda, and a reducing agent, such as, hydrosulfite, in sufficient amount to reduce the indigo dye are added thereto. The resultant mixture is kept at a temperature of from room temperature to 70° C. to reduce the indigo dye, thereby preparing a reduction bath. To the reduction bath of the indigo dye, the red-type indirubin derivative and the yellow-type quinophthalone derivative are added to prepare a dye bath containing the three components in coexistence.

In the case of using the dye composition of the invention, a dye bath is prepared by the addition of a reducing agent and an alkali to the composition in amounts required for the reduction.

In the dyeing process, in which a dye bath containing only the red-type indirubin and yellow-type quinophthalone derivatives and a reduction bath containing only an indigo dye are prepared independently, the dye bath containing the indirubin and quinophthalone derivatives are prepared by the addition of an alkali as described above, while the reduction bath containing the indigo dye is provided by adding caustic soda and hydrosulfite to its thick reduction tank prepared separately from the dye bath and reducing the indigo dye at a temperature of from room temperature to 70° C. in the manner as described above to prepare a thick reduction bath. A dye bath of a proper concentration is derived from the reduction bath.

A typical embodiment of the dyeing process of the invention is described below. Similarly to the case of cotton warps for conventional blue jeans, a number of single yarns are formed into a piece of rope in the form of a tow which is thereafter wound into a ball. The ball-shaped warps are drawn simultaneously in large number and immersed for a short period of time in pairs of dye bathtubs having the above prepared dye bath or reduction bath contained therein. Then, the warps are squeezed and oxidized with air. By repeating a series of these steps, the yarns are dyed in a continuous manner.

When dyeing is conducted separately in a dye bath containing the red-type indirubin and yellow-type quinophthalone derivatives and in a reduction bath containing an indigo dye, denim cotton warps are immersed in a dye bathtub containing only an indigo reduction solution, squeezed with a mangle, and then oxidized with air. These steps are repeated several times to dye the warps dark blue. The resultant warps are immersed in a dye bath containing an alkali-dissolved solution or alkaline solution of the red-type indirubin and yellow-type quinophthalone derivatives and hydrosulfite, thus dyeing red and yellow over the dark blue. When dyeing is conducted in a dye bath containing indigo dye, indirubin derivatives and quinophthalone derivatives, denim cotton warps are immersed in a dye bathtub containing the aforementioned dye bath, alkali solution and hydrosulfite, squeezed with a mangle, and then oxidized with air. These steps are repeated several times to dye the warps grey to black. These steps are repeated several times to dye denim warps with desired hues through topping. Such procedure permits the integrated coloring of denim cotton warps and also are favorable from the standpoint of operation.

In the process of the invention, the yellow-type quinophthalone derivative can dye denim cotton warps in gradual thickness by repeated immersion in its alkali-dissolved solution without any particular reduction operation. However, as is the case with indigo, a reduction operation can enhance its dyeing effects.

The dyed articles obtained by the process of the present invention have excellent color fastness to light and decoloring functions by bleaching with chlorine, and the dyeing warp after bleaching are pale color uniformly.

The application of the process of the invention to the continuous rope-dyeing of cotton denim warps allows the dyeing of the warps red or yellow, or the dyeing of them with a color ranging from grey to black by integration with indigo. The resultant dyed articles are excellent in light fastness, have decoloring functions by bleaching with chlorine, and shows substantially no changes of color tone with the passage of time.

The dye cotton yarns are used as warps to twill them with other undyed or dyed yarns, thus producing color denim. The color denim can meet the demand for color jeans from the market.

The invention is illustrated by reference to the following examples. In the examples, part or parts signify part or parts by weight.

EXAMPLE 1

Fifty parts of Mitsui Indigo Pure EX (indigo manufactured by Mitsui Toatsu Dye, Ltd.), 40 parts of solid caustic soda, 45 parts of hydrosulfite, and water were added together to prepare 1,000 parts of a solution. The solution was heated at 70° C. for 15 minutes to obtain a thick indigo reduction solution. To 60 parts of the reduction solution were added 1 part of hydrosulfite, 0.5 part of caustic soda, and water as the rest to prepare 1,000 parts of an indigo dye bath. Hot water washed denim cotton yarns were immersed in the dye bath at room temperature for 30 seconds and squeezed with a mangle, followed by airing for 90 seconds. The steps of immersion, squeezing and airing were repeated 6 times. Then the warps were immersed in 1,000 parts of a dye bath of indirubin and quinophthalone derivatives, which had been prepared by adding 0.5 part of a dye represented by the formula (IV):

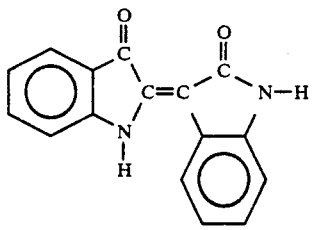

1.5 parts of a dye represented by the formula (V):

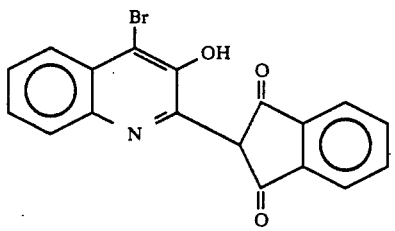

1.5 parts of solid caustic soda and water as the rest, at room temperature for 30 seconds, squeezed with a mangle and then submitted to airing for 90 seconds. These steps were repeated two times. Black denim cotton warps were obtained by way of water washing and drying. The resultant dyed article had excellent light fastness and was decolored by immersing it in a 3 g/l aqueous solution of sodium hypochlorite containing 10 percent of available chlorine at 40° C. for 20 minutes and became pale uniformly.

EXAMPLE 2

Two parts of a red-type indirubin represented by the formula (IV), 4 parts of a yellow-type quinophthalone derivative represented by the formula (V), 12 parts of Mitsui Indigo Pure EX (manufactured by Mitsui Toatsu Dye, Ltd.), 20 parts of hydrosulfite, 20 parts of caustic soda, and water were added together to prepare 1,000 parts of a solution. The solution was heated at 70° C. for 15 minutes to obtain a thick reduction solution. To 250 parts of the reduction solution were added 1 part of hydrosulfite, 0.5 part of caustic soda, and water to prepare 1,000 parts of a dye bath. Hot-water washed denim cotton warps were immersed in the dye bath at room temperature for 30 seconds, squeezed with a mangle and submitted to airing for 90 seconds. After the steps of immersion, squeezing and airing had been repeated three times, the warps were washed with water and dried to obtain black denim cotton warps. The resultant dyed article was excellent in light fastness and exhibited a decoloring effect by treating it at 40° C. for 20 minutes in a 3 g/l aqueous solution of sodium hypochlorite containing 10 percent of available chlorine. Dyeing and decoloring states were shown in table 1.

EXAMPLE 3

Hot-water washed denim cotton warps were treated under the same conditions as in Example 2 except that Indigo Pure EX and the yellow-type quinophthalone derivative were not used, whereby red denim cotton warps were obtained. The resultant dyed article was excellent in light fastness and decolored to pale red by treating it at 40° C. for 20 minutes in a 3 g/l aqueous solution of sodium hypochlorite containing 10 percent of available chlorine.

EXAMPLE 4

A dye composition was prepared by adding and mixing 60 parts of Indigo Pure EX, 10 parts of red-type 2,3'-bisindole of the formula IV, 30 parts of 2-phthaloyl-methylidyne-3-hydroxy-4-bromoquinoline and 5 parts of a hydrous sodium sulfate. To 20 parts of the dye composition were added 20 parts of solid caustic soda, 20 parts of hydrosulfite, and water to prepare 1,000 parts of the solution. The solution was heated at 70° C. for 15 minutes to prepare a thick reduction solution. To 250 parts of the solution thus prepared were added 1 part of hydrosulfite and 0.5 part of solid caustic soda to provide 1,000 parts of a dye bath. Hot water washed denim cotton warps were immersed in the dye bath at room temperature for 30 seconds, squeezed with a mangle and then submitted to airing for 90 seconds. After the steps of immersion, squeezing and airing had been repeated 6 times, the resultant warps were washed with water and dried to obtain black denim cotton warps. The dyed article had excellent light fastness and was decolored by treating it at 40° C. for 20 minutes in a 3 g/l aqueous solution of sodium hypochlorite containing 10 percent of available chlorine. The resultant article had a reduced color thickness as a whole and its hue was grey.

EXAMPLE 5

A continuous dyeing was conducted in the same manner as in Example 1 except for the use of the red-purple dibromo substitute of 2,3'-bisindole represented by the formula (VI):

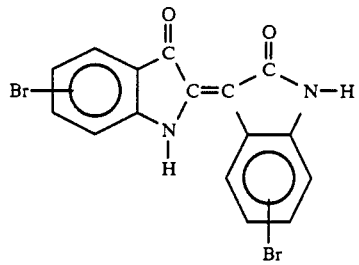

in place of the compound of the formula (IV) in Example 1. The resultant warps were washed with water and dried to obtain black denim cotton warps, similarly to Example 1. The warps were superb in light fastness and exhibited a decoloring effect by treating them at 40° C. for 20 minutes in a 3 g/l aqueous solution of sodium hypochlorite containing 10 percent of available chlorine, the hue of the decolored warps being grey.

EXAMPLE 6

The treatment was conducted under the same conditions as in Example 3 by using the compound of the formula (VI) in place of the compound of the formula (IV), thereby obtaining red-purple denim cotton warps. The dyed article had excellent light fastness like that obtained in Example 3 and was decolored to pale red-purple by treating it at 40° C. for 20 minutes in a 3 g/l aqueous solution of sodium hypochlorite containing 10 percent of available chlorine.

COMPARATIVE EXAMPLE 1

With a typical yellow-type vat dye at C.I. Vat Yellow 2 (Mikethren Yellow GCN s/f: manufactured by Mitsui Toatsu Dye, Ltd.), C.I. Vat Red 31 (Mikethren Red F3B s/f: manufactured by Mitsui Toatsu Dye, Ltd.) and Indigo pure EX (manufactured by Mitsui Toatsu Dye, Ltd.), cotton warps were dyed in the same manner as in Example 2.

For comparison with the cotton warps obtained in Example 2, dyeing states were observed and decoloring tests were carried out in accordance with the following procedures.

Dyeing state: Dyed yarns were cut with a cutter knife and their cutting fiber faces were observed.

Decoloring test: Dyed yarns were treated at 40° C. for 20 minutes in a 3 g/l aqueous solution of sodium hypochlorite containing 10 g/l of available chlorine.

Results are given in Table 1.

TABLE 1

|  | Comparative Example 1 | Example 2 |
|---|---|---|
| Dyeing state | Dyed black near the surface of fiber and brown in the center of fiber. | Dyed black in the form of a ring near the surface of fiber but not dyed in the center of fiber, showing a state of so-called center-white. |
| Decoloring state | Decolored from black to brown | Decolored uniformly to pale grey. |

What is claimed is:

1. A dye composition for dyeing denim cotton yarns comprising (a) at least one halogenated indirubin derivative represented by formula (I):

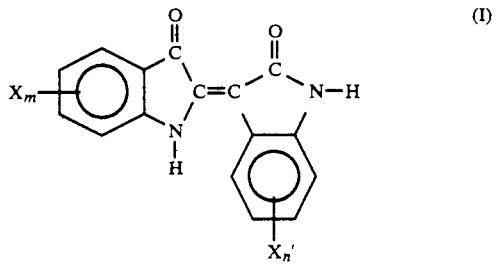

wherein X is a hydrogen atom, a bromine atom or a chlorine atom, X' is a hydrogen atom, a bromine atom or a chlorine atom, but when either X or X' is a hydrogen atom, the other is not a hydrogen atom, m is 1 to 2 and n is 1 or 2, and (b) indigo.

2. A dye composition for dyeing denim cotton yarns comprising (a) at least one halogenated indirubin derivative represented by formula (I):

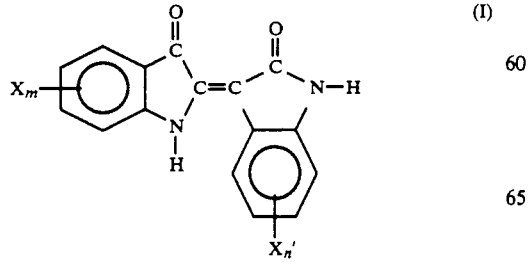

wherein X is a hydrogen atom, a bromine atom or a chlorine atom, X' is a hydrogen atom, a bromine atom or a chlorine atom, but when either X or X' is a hydrogen atom, the other is not a hydrogen atom, m is 1 to 2 and n is 1 to 2, and (b) at least one yellow-type quinophthalone derivative represented by formula (II) or (III):

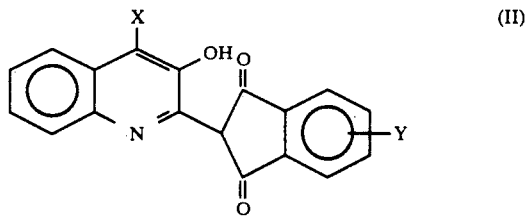

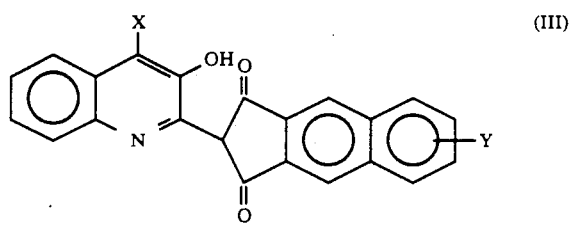

wherein X is a hydrogen atom, a bromine atom or a chlorine atom and Y is a hydrogen atom, a —COOR group or a —COOC$_2$H$_4$OR group, in which R is an alkyl group.

3. A dye composition for dyeing denim cotton yarns comprising (a) at least one halogenated indirubin derivative represented by formula (I):

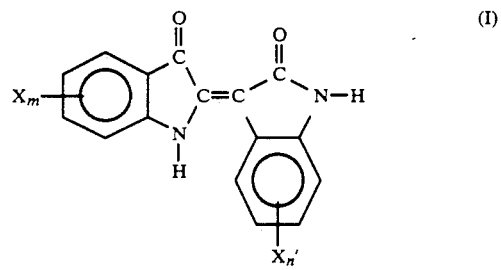

wherein X is a hydrogen atom, a bromine atom or a chlorine atom X' is a hydrogen atom, a bromine atom or a chlorine atom, but when either X or X' is a hydrogen atom, the other is not a hydrogen atom, m is 1 or 2 and n is 1 or 2, and (b) at least one yellow-type quinophthalone derivative represented by formula (II) or (III):

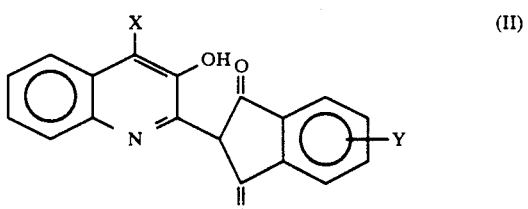

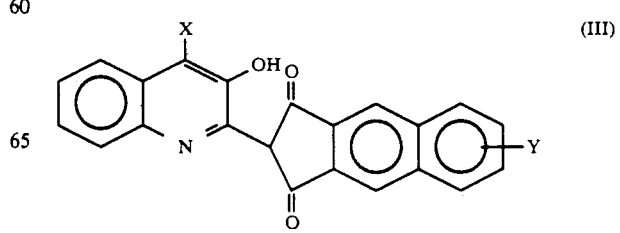

wherein X is a hydrogen atom, a bromine atom or a chlorine atom and Y is a hydrogen atom, a —COOR group or a —COOC₂H₄OR group, in which R is an alkyl group, and (c) indigo.

4. The dye composition according to claim 3 wherein the proportion of the indirubin derivative, yellow-type quinophthalone derivative and indigo is approximately 1:3:6.

5. A rope-dyeing process of denim cotton warps comprising forming denim cotton warps into a rope, immersing the rope in a dye bath containing a halogenated indirubin derivative represented by formula (I):

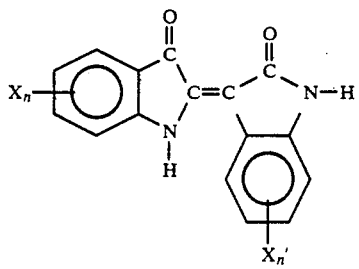

wherein X is a hydrogen atom, a bromine atom or a chlorine atom, X' is a hydrogen atom, a bromine atom or a chlorine atom, but when either X or X' is a hydrogen atom, the other is not a hydrogen atom, m is 1 or 2 and n is 1 or 2, squeezing and air-oxidizing the dyed rope, and repeating a series of these steps.

6. A rope-dyeing process for denim cotton warps comprising forming denim cotton warps into a rope, immersing the rope in a dye bath containing the dye composition according to claim 1, squeezing and air-oxidizing the dyed rope, and repeating a series of these steps.

7. A rope-dyeing process for denim cotton warps comprising forming denim cotton warps into a rope, immersing the rope in a dye bath containing the dye composition according to claim 2, squeezing and air-oxidizing the dyed rope, and repeating a series of these steps.

8. A rope-dyeing process for denim cotton warps comprising forming denim cotton warps into a rope, immersing the rope in a dye bath containing the dye composition according to claim 19, squeezing and air-oxidizing the dyed rope, and repeating a series of these steps.

9. A black-ropedyeing process for denim cotton warps comprising forming denim cotton warps into a rope, immersing the rope in a dye bath containing indigo, squeezing and air-oxidizing the dyed rope, repeating a series of these steps, then immersing the resultant rope in a dye bath containing the dye composition according to claim 4, squeezing and air-oxidizing the said rope, and repeating a series of the latter steps.

10. A denim cotton yarn dyed by the dyeing process according to claim 5.

11. A denim cotton yarn dyed by the dyeing process according to claim 6.

12. A denim cotton yarn dyed by the dyeing process according to claim 7.

13. A denim cotton yarn dyed by the dyeing process according to claim 8.

14. A denim cotton yarn dyed by the dyeing process according to claim 9.

* * * * *